United States Patent
Storace

(10) Patent No.: US 10,954,030 B2
(45) Date of Patent: Mar. 23, 2021

(54) CORNER CONNECTOR AND A CONTAINER COMPRISING SAME

(71) Applicant: Carmel Paul Storace, Ontario, CA (US)

(72) Inventor: Carmel Paul Storace, Ontario, CA (US)

( * ) Notice: Subject to any disclaimer, the term of this patent is extended or adjusted under 35 U.S.C. 154(b) by 1 day.

(21) Appl. No.: 16/333,259

(22) PCT Filed: Sep. 14, 2017

(86) PCT No.: PCT/CA2017/051083
§ 371 (c)(1),
(2) Date: Mar. 14, 2019

(87) PCT Pub. No.: WO2018/049525
PCT Pub. Date: Mar. 22, 2018

(65) Prior Publication Data
US 2019/0248541 A1    Aug. 15, 2019

Related U.S. Application Data

(60) Provisional application No. 62/394,439, filed on Sep. 14, 2016.

(51) Int. Cl.
| | | |
|---|---|---|
| *B65D 6/24* | (2006.01) | |
| *B65D 21/02* | (2006.01) | |
| *B65D 71/02* | (2006.01) | |
| *B65D 25/10* | (2006.01) | |

(52) U.S. Cl.
CPC ...... *B65D 11/1873* (2013.01); *B65D 21/0209* (2013.01); *B65D 25/10* (2013.01); *B65D 71/02* (2013.01); *B65D 2313/04* (2013.01)

(58) Field of Classification Search
CPC .. B65D 11/1873; B65D 2313/04; B65D 9/24; B65D 11/18; B65D 7/24; B65D 9/12; F16B 12/02; F16B 12/46
See application file for complete search history.

(56) References Cited

U.S. PATENT DOCUMENTS

| | | |
|---|---|---|
| 3,315,639 A | 4/1967 | Close |
| 4,045,104 A | 8/1977 | Peterson |
| 5,647,687 A * | 7/1997 | Robinson ............. A47B 95/002 312/228 |

(Continued)

FOREIGN PATENT DOCUMENTS

| | | |
|---|---|---|
| EP | 0709582 A2 | 5/1996 |
| KR | 20130035547 A | 4/2013 |

(Continued)

OTHER PUBLICATIONS

PCT Office, International Search Report issued in PCT/CA2017/051083 dated Dec. 18, 2017, 4 pages.

(Continued)

*Primary Examiner* — Shawn M Braden
(74) *Attorney, Agent, or Firm* — Wood Herron & Evans LLP

(57) ABSTRACT

The present invention provides a corner connector for use in forming transport, storage and display containers and a transport, storage and display container system of stacking compartments that can be interconnected and formed into multiple orientations according to the user's needs.

16 Claims, 9 Drawing Sheets

(56) References Cited

U.S. PATENT DOCUMENTS

| | | | | |
|---|---|---|---|---|
| 5,915,803 | A * | 6/1999 | Daugherty | A47B 46/00 312/263 |
| 6,554,148 | B1 * | 4/2003 | Fernandez | B65D 9/12 220/4.33 |
| 8,051,535 | B2 | 11/2011 | Cheng | |
| 2005/0006991 | A1 * | 1/2005 | Saravis | F16B 12/26 312/111 |
| 2011/0303813 | A1 | 12/2011 | Lijesnic | |
| 2013/0318782 | A1 * | 12/2013 | Eding | B65D 25/00 29/700 |
| 2016/0001971 | A1 | 1/2016 | Kelinske | |
| 2016/0073547 | A1 * | 3/2016 | Maloney | H05K 7/183 211/26 |
| 2016/0238047 | A1 * | 8/2016 | Chubak | F16B 12/46 |

FOREIGN PATENT DOCUMENTS

| | | | |
|---|---|---|---|
| WO | 2009006864 | A1 | 1/2009 |
| WO | 2012023651 | A1 | 2/2012 |
| WO | 2016141493 | A1 | 9/2016 |

OTHER PUBLICATIONS

European Patent Office, Extended Search Report issued in EP 17849966.1 dated Mar. 2, 2020.
Chinese Patent Office, Office Action issued in CN 201780062520.7 dated Apr. 3, 2020.

* cited by examiner

CORNER CONNECTOR AND A CONTAINER COMPRISING SAME

FIELD

The present invention pertains to the field of protective transport, storage and display containers. More specifically, the present invention relates to a transport, storage and display container and system of stacking compartments that can be interconnected and formed into multiple orientations depending upon the user's needs.

BACKGROUND

Transport, storage and display containers are used throughout the world in trade and service industries to transport, store and display goods, tools and other objects. These containers are very important for protection and presentation, and some are compartmentalized to provide further organization and security.

Vendors are constantly seeking novel ways in which to ensure the protection of their goods during transport and storage. Often the protection provided in transport and storage cases is of a generic design and does not take into account the customization required for the particular needs of a specific good. Therefore, there is a need for the vendor to have the ability to quickly and easily alter the orientation of transport or storage containers in order to provide the user with a wide range of functional uses of a container, including enhanced protection for the specific good that will be transported or stored.

Vendors are also constantly seeking novel ways to display their goods for sale in a convenient and appealing way to consumers. Often, these vendors are also required to transport their goods to different locations in order to attend trade fairs or visit potential clients. Many available transport containers are cumbersome and aesthetically unappealing and so vendors are required to transport and display their goods in alternative containers. Therefore, there is need for an appealing display container that is also able to safely transport goods.

Accordingly, there is need for a transport, storage and display case that can provide both security and protection for goods during transport, along with appealing and secure display capabilities, while allowing the user to orient the case in a customized manner to suit their particular needs.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In accordance with the present invention, there is provided a corner connector and a transport, storage and display container formed using the corner connector, wherein the container is suitable for use in protecting goods during transport or storage, while having the capability to display goods securely and in an aesthetically appealing way. Accordingly, the present corner connector provides a system that is readily convertible between a display configuration and a stacked transport/storage configuration.

In one embodiment, the present invention provides a corner connector for connecting a first sidewall, a second sidewall and a bottom member to form a corner of a container, the connector comprising: an inner portion comprising a first inner wall, a second inner wall, and a bottom wall, the first inner wall comprising a first sidewall slot, the second inner wall comprising a second sidewall slot, and the bottom wall comprising a bottom slot, wherein the first sidewall slot, the second sidewall slot and the bottom slot are mutually orthogonal; an outer portion comprising a first outer wall, a second outer wall and a top wall, the outer portion being adapted for secure attachment to the inner portion when the connector is assembled; wherein the first sidewall slot is adapted to receive an end of the sidewall, the second sidewall slot is adapted to receive an end of the second sidewall, and the third bottom slot is adapted to receive a corner of the bottom member. In one embodiment, the top wall of the outer portion further comprises a first recess adapted to fit a first magnet, and the bottom wall of the inner portion comprises a second recess adapted to fit a second magnet.

In one embodiment, the present invention provides a container comprising four sidewalls, a bottom member, and four corner connectors in accordance with the present invention, wherein each end of the sidewalls is inserted into a sidewall slot of a respective corner connector, and each corner of the bottom member is inserted into a bottom slot of a respective corner connector.

In one embodiment, the present invention provides a transport and storage system comprising: two or more containers in accordance with the present invention; and optionally a molded insert sized to fit within each of the containers.

BRIEF DESCRIPTION OF THE FIGURES

Embodiments of the present invention will be better understood in connection with the following Figures, in which.

DETAILED DESCRIPTION OF THE EMBODIMENTS

Figure 1:
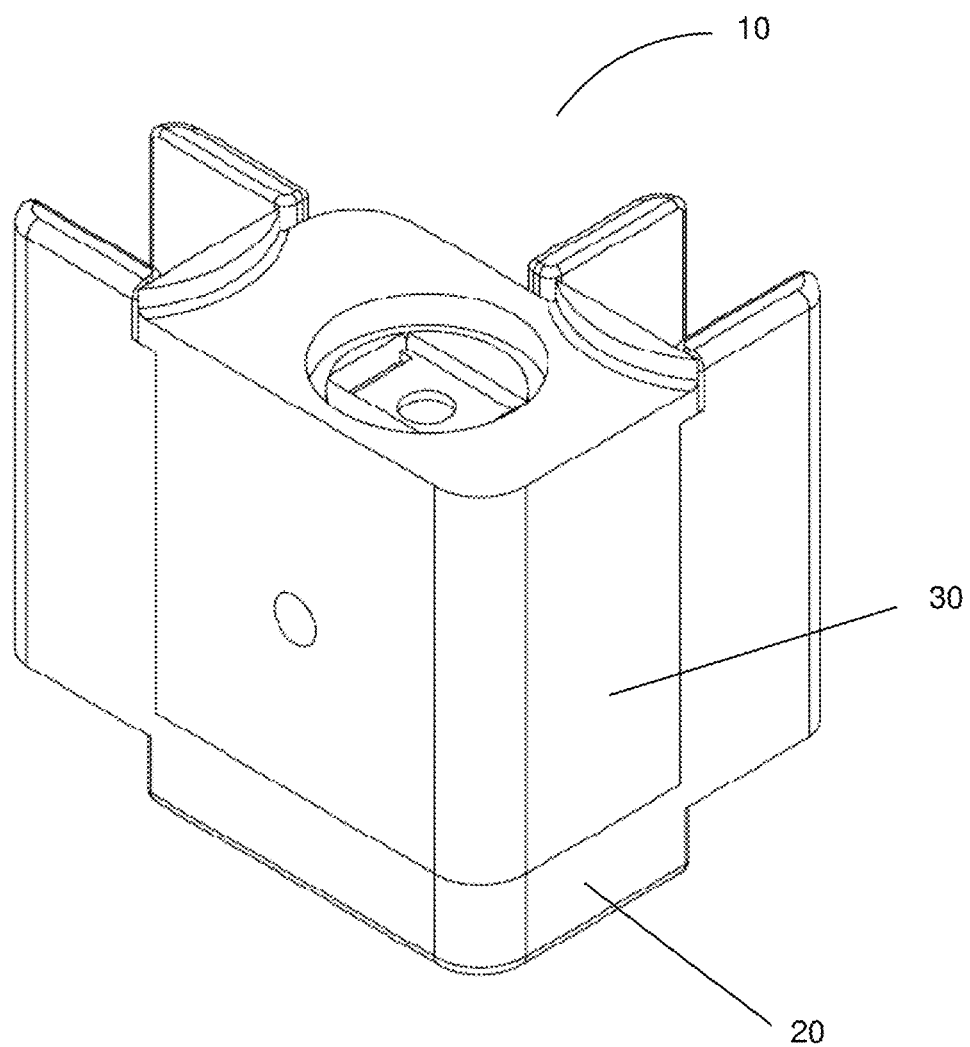
FIG. 1 illustrates top perspective view of a corner connector in accordance with one embodiment of the invention.

Unless defined otherwise, all technical and scientific terms used herein have the same meaning as commonly understood by one of ordinary skill in the art to which this invention belongs.

In accordance with the present disclosure, the terms "box", "case" and "container" are used interchangeably, and are generally employed to describe a receptacle comprising two side walls, two end walls and a bottom member, and optionally a top (cover) member, and which is typically rectangular or square in shape.

The present invention provides a corner connector suitable for use in the assembly of a container by facilitating the connection of sidewalls and a bottom member to form a corner of the container. An assembled container in accordance with the present invention comprises four corner connectors, four sidewalls, and a bottom member.

Suitably located magnets are provided on the connectors to provide a container suitable for stacking with other like containers, thereby providing a stable storage system comprising a plurality of stacked storage containers. In accordance with the present invention, the storage system is easily converted from a stacked transport/storage configuration to a secure display configuration. In one embodiment, the storage configuration comprises two or more stackable containers. In the transport/storage configuration, the containers are stacked for convenient transportation. In one embodiment of such a configuration, the bottom of an upper container may act as a cover for the container below, and the uppermost container of the stack is provided with a top configured to cover the open upper face of the container.

The system is readily converted from the transport/storage configuration to the display configuration, by unstacking the containers, and setting the respective containers side by side to facilitate display of the contents of the containers.

The individual containers are therefore optionally provided with magnets that are located to facilitate a secure display configuration. Accordingly, the containers can be magnetically fastened or interconnected to one another, and formed into different orientations depending upon the desired application of the system. The individual containers are further provided with magnets to facilitate secure transportation in the stacked transport/storage configuration.

Further, it is contemplated that the present invention can be utilized to store, transport and display any number or type of items. For example, the system may be suitable for use in displaying and transporting retail goods. It is also contemplated that the system disclosed herein may be used in any context where flexibility in the configuration of the system is desired, for example, in the secure transport or storage of an assembled system in an irregularly shaped space.

In one embodiment, each corner of the container is formed using a corner connector to connect the sidewalls to the bottom member. The connector is formed of two parts: an inner portion and an outer portion. The inner portion comprises a first inner wall on which a first sidewall slot is located, a second inner wall on which a second sidewall slot is located, and a bottom wall on which a bottom slot is located. The first sidewall slot, the second sidewall slot and the bottom slot are mutually orthogonal. The outer portion of the connector comprises a first outer wall, a second outer wall and a top wall, and is adapted for secure attachment to the inner portion when the connector is assembled, preferably through snap connection. In a preferred embodiment, the first inner wall, the second inner wall and the bottom wall of the inner portion are mutually orthogonal, and the first outer wall, the second outer wall and the top wall of the outer portion are mutually orthogonal.

The first and second sidewall slots are adapted to receive a respective end of a sidewall. The sidewalls may be formed of any material, preferably lightweight and sturdy, including but not limited to high density foam, rubber, wood, plastics, laminated low density foam, or any suitable polymeric material.

In one embodiment, the end of a sidewall is secured to the connector by inserting a fastener through an opening in the inner wall. Any suitable fastener is within the scope of the present invention and will be chosen according to the materials used to form the sidewalls, including but not limited to screw fasteners, nails, press fittings, and expanding fittings. The bottom slot is adapted to receive a corner of the bottom member. It is also within the scope of this invention that the sidewalls may be retained in the respective slots through the use of an adhesive.

In a preferred embodiment, the top wall of the outer portion and the bottom wall of the inner portion each further comprise a recess adapted to fit a magnet. When two containers are in a stacked arrangement, these magnets are located to provide magnetic interaction between a magnet on the bottom wall of a corner connector of an upper container with a magnet on the top wall of a corner connector of a lower container, thereby providing a stable stacking arrangement.

In one embodiment, the top wall of an assembled corner connector comprises one or more protrusions which engage with one or more corresponding recessed portions in the bottom wall of an adjacent assembled corner connector to better align the magnets and facilitate the stacking process, thereby allowing for quick and effortless magnet orientation.

Further, it is contemplated that in one embodiment, the recesses are circular in shape and can optionally include slots shaped to receive pins provided on the magnets to retain the magnets in place in the recess. However, other arrangements for retaining the magnets in the recess will be readily appreciated by the skilled person. For example, the magnets may be held in place in the recess through the use of adhesives, snap connections, or hook and loop fasteners.

In one embodiment, the magnet in the recess in the bottom wall of the corner connector is provided with pins suitable for engaging and fixing the bottom member in place within the bottom slot.

In one embodiment, two or more containers together form a system for transporting, storing and displaying goods. In one embodiment, the system optionally includes molded inserts sized to fit within the container and suitably shaped to accommodate the goods being displayed.

The assembled storage container may also be provided with a top portion (cover). In one embodiment of the present invention, the top/cover portion may be formed of a clear material suitable for display purposes, such as a polymeric material or glass. In one embodiment, top portion is formed of polypropylene.

In one embodiment of the present invention, the container is optionally provided with one or more magnets located in a recess on an outer surface of corner connector, e.g., on the first and/or second outer walls of the outer portion. The magnets are located in a position that facilitates secure interaction between adjacent containers arranged in the display configuration. For example, when the containers are arranged side by side in the display configuration, the magnets on the outer surface of adjacent containers are in a suitable position to maximize the magnetic interaction between adjacent containers, thereby providing a secure display configuration.

Locating the magnets in recesses thereby ensures that the sides of adjacent containers are in contact with each other while also maintaining the necessary magnetic interaction to securely hold the adjacent containers in the desired display configuration.

In one embodiment, the sidewalls are further provided with at least one handle to facilitate conversion from the stacked configuration to the display configuration, and vice versa.

In one embodiment, the transport, storage and display system of the present invention comprises a plurality of assembled containers. It is contemplated that the system in the stacked transport/storage configuration may comprise any number of containers, provided that the stacked assembly is transportable. The number of containers that may be considered to be suitable will be determined by the size of the respective individual containers and the resulting overall size of the stacked containers. In one embodiment, the system comprises between 2 to 15 containers.

In accordance with the present invention, an assembled container is configured to stack upon another assembled container. To facilitate stacking, the bottom wall of the inner portion of an upper container is further configured to securely engage the top wall of the outer portion of a lower container.

In a further preferred embodiment, a first magnet is provided in a recess located in the top wall of the outer portion, and a second magnet is provided in a recess located in the bottom wall of the inner portion. In this embodiment, the first and second magnets are located to provide secure interaction between adjacent containers when two or more of the containers are in the stacked transport/storage configuration.

In accordance with the present invention, the system further comprises a strapping system comprising one or more straps of a suitable length to wrap around a plurality of storage containers in the stacked transport/storage configuration. In a preferred embodiment, the ends of the straps overlap at the respective ends when wrapped around the stacked containers in the transport/storage configuration. The ends of the straps may be attached to each other using any suitable fastener mechanism known in the art, including, but not limited, to Velcro® (hook and loop) fasteners, or snap fasteners, or buttons.

In one embodiment, the containers comprise magnets on the external surfaces of the assembled containers that can be used with the strapping system. These magnets may be located on the first and/or second outer walls of the connectors or on an outer surface of the sidewalls.

In such an embodiment, the strap(s) are further provided with a series of magnets located to interact with the magnets located on the external surfaces of the container when the one or more containers are in the stacked transport/storage configuration and the straps are wrapped around the stacked containers, to provide additional security during transportation.

The strapping system further comprises a handle attached to the strap(s) in a location suitable for convenient transport of the stacked containers. In one embodiment, the handle is removably connected to the straps by a suitable clipping system. In this implementation, the handle may be removed, for example, to access the uppermost container without requiring removal of the magnetically engaged straps while in the stacked transport/storage configuration.

In a further embodiment, the system further comprises wheels attached to the bottom portion of a lowermost container of a plurality of containers in the stacked transport/storage configuration. The wheels are provided to facilitate transport of the containers in the stacked configuration.

It is further contemplated that, in one embodiment, a suitable covering sheath may be provided in order to provide protection to multiple interconnected, stacked storage containers. In this way, the storage containers system can be secured and further protected from rain, prying eyes, or being upset during transport.

Figure 2:
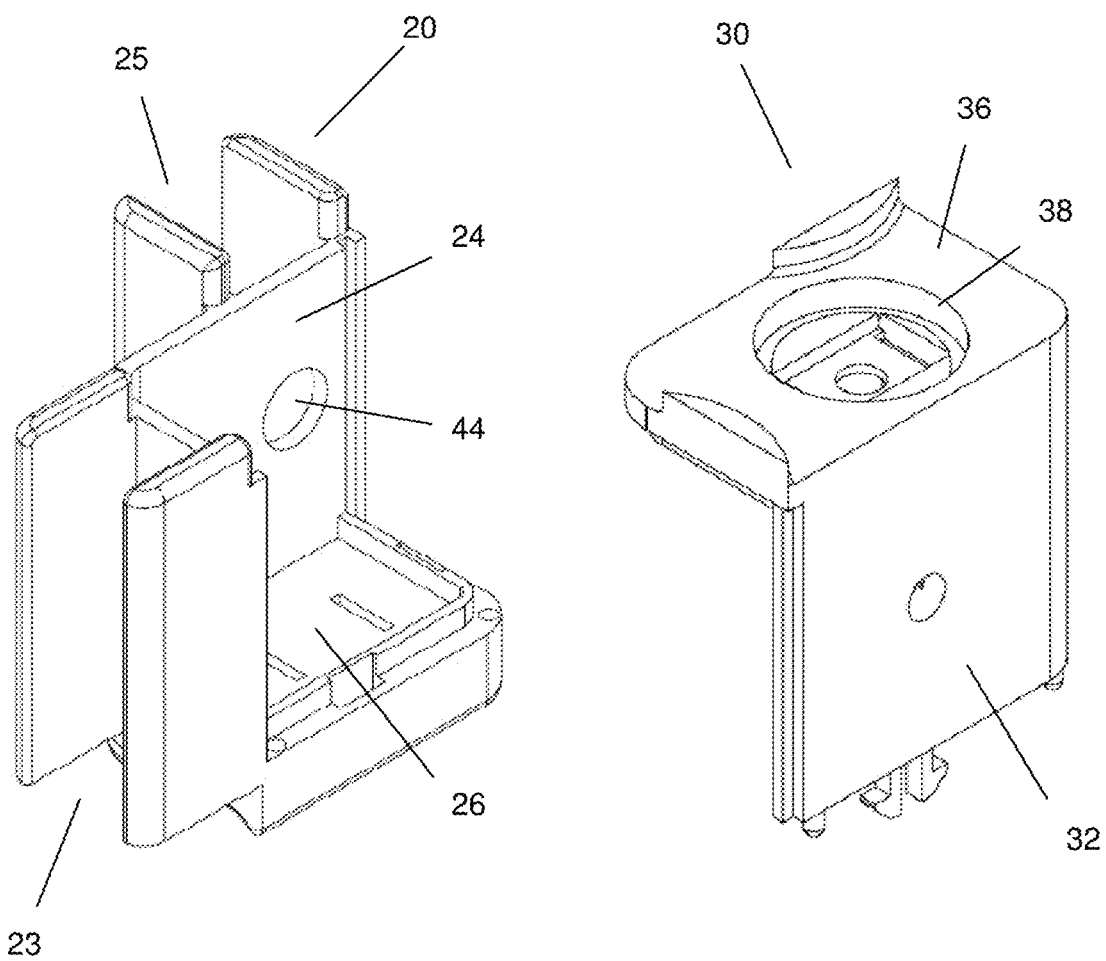
FIG. 2 illustrates an exploded perspective view of a corner connector in accordance with one embodiment of the invention.

One embodiment of a corner connector 10 is shown in FIG. 1 in its assembled configuration, including inner portion 20 and outer portion 30, and in an exploded view in FIG. 2.

In this embodiment, inner portion 20 comprises first inner wall 22, second inner wall 24 and bottom wall 26. Also shown is a first sidewall slot 23, and second sidewall slot 25 with opening 44 for receiving a fastener (not shown) for fastening an end of the first sidewall to connector 10.

As can also be seen in FIG. 2, outer portion 30 comprises first outer wall 32, second outer wall 34 (not shown in FIG. 2) and top wall 36. Top wall 36 further comprises recess 38 adapted to fit a magnet (not shown).

Figure 3:
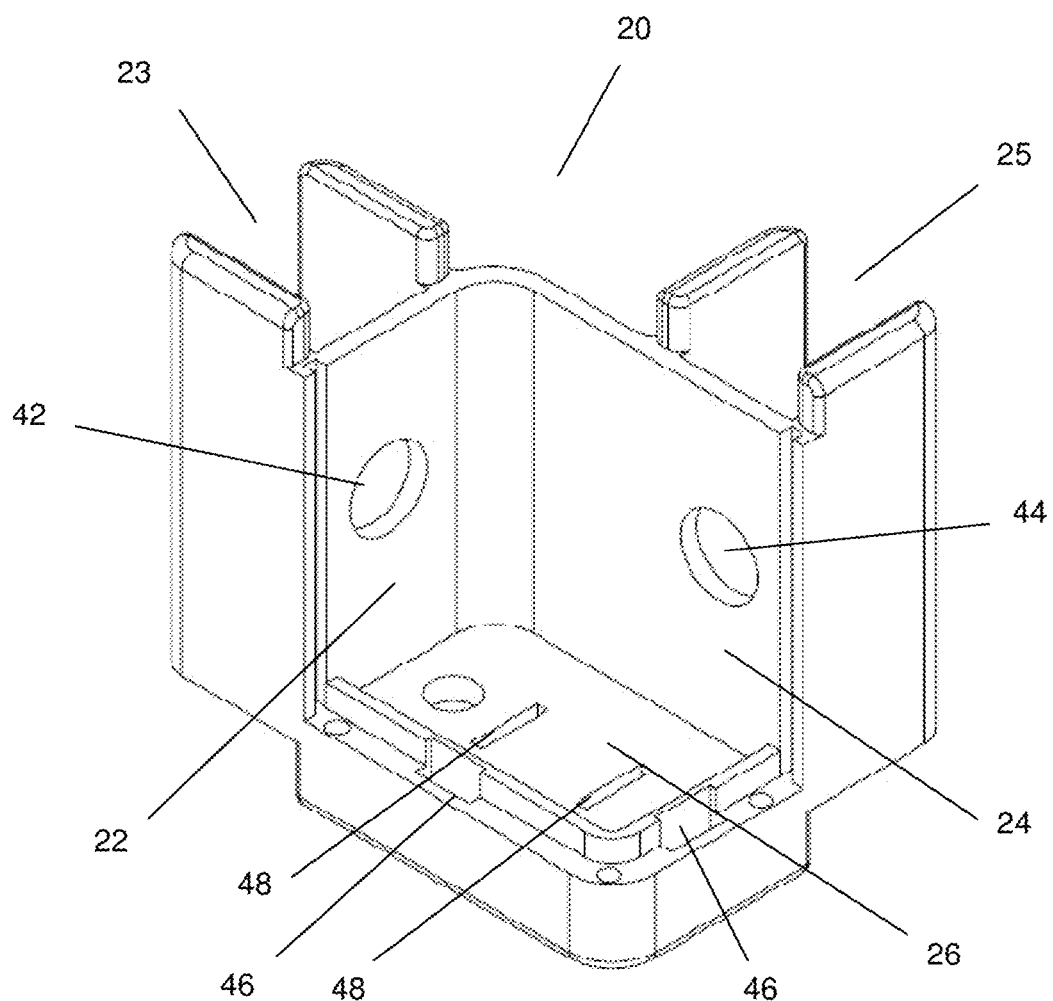
FIG. 3 illustrates a top perspective view of an inner portion of a corner connector in accordance with one embodiment of the invention.

Turning to FIG. 3, inner portion 20 is shown in further detail, including first and second inner side walls 22 and 24 having openings 42 and, 44 respectively, each of openings 42 and 44 being adapted to receive a fastener (not shown) for fastening an end of a sidewall to connector 10. Also shown are snap fit fastener slots 46 adapted to receive snap fit fastener prongs provided on a respective outer portion 30 (not shown) and slots 48 located in bottom wall 26 adapted to receive magnet prongs (not shown).

Figure 4:
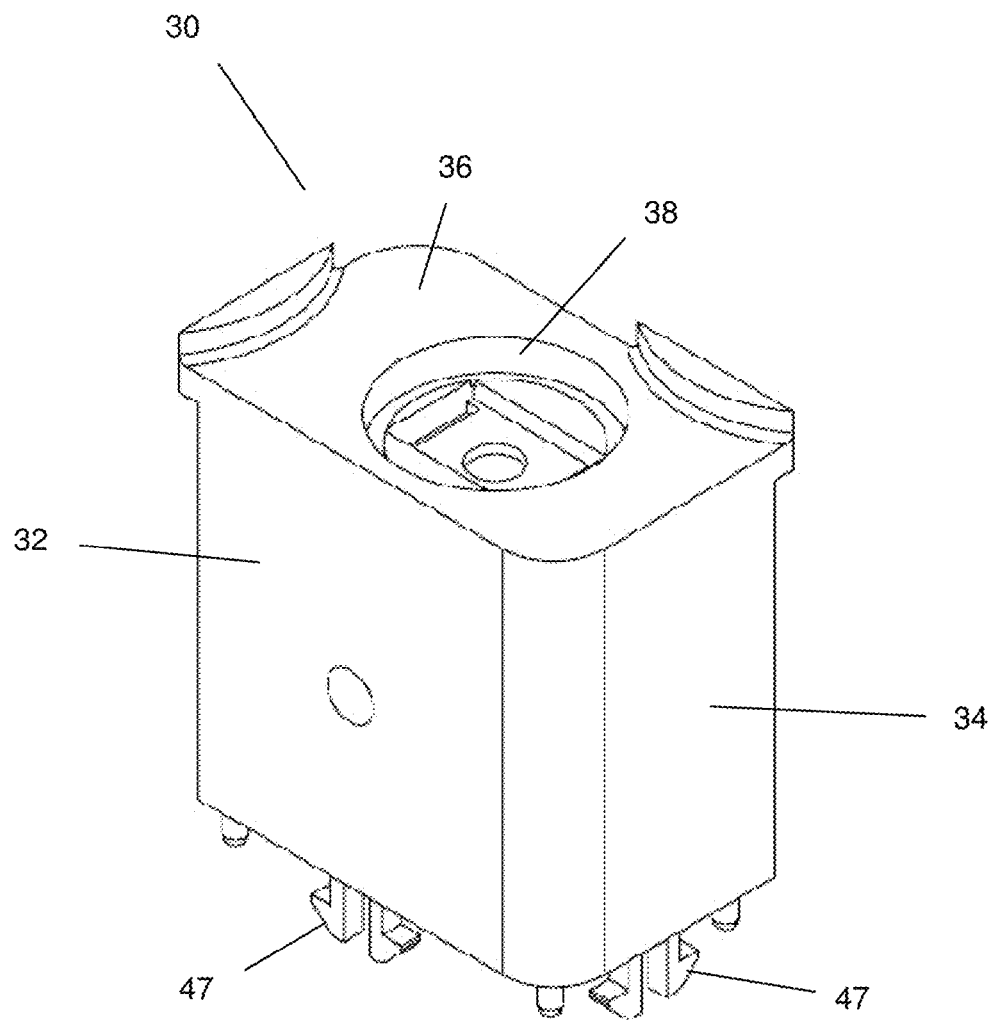
FIG. 4 illustrates a perspective view of an outer portion of a corner connector in accordance with one embodiment of the invention.

Turning to FIG. 4, outer portion 30 is shown in further detail, including snap fit fastener prongs 47, each adapted to engage with a respective snap fit fastener slot on a respective inner portion 20 (not shown). Also shown is magnet recess 38 on top wall 36, adapted to fit a magnet (not shown).

Figure 5:
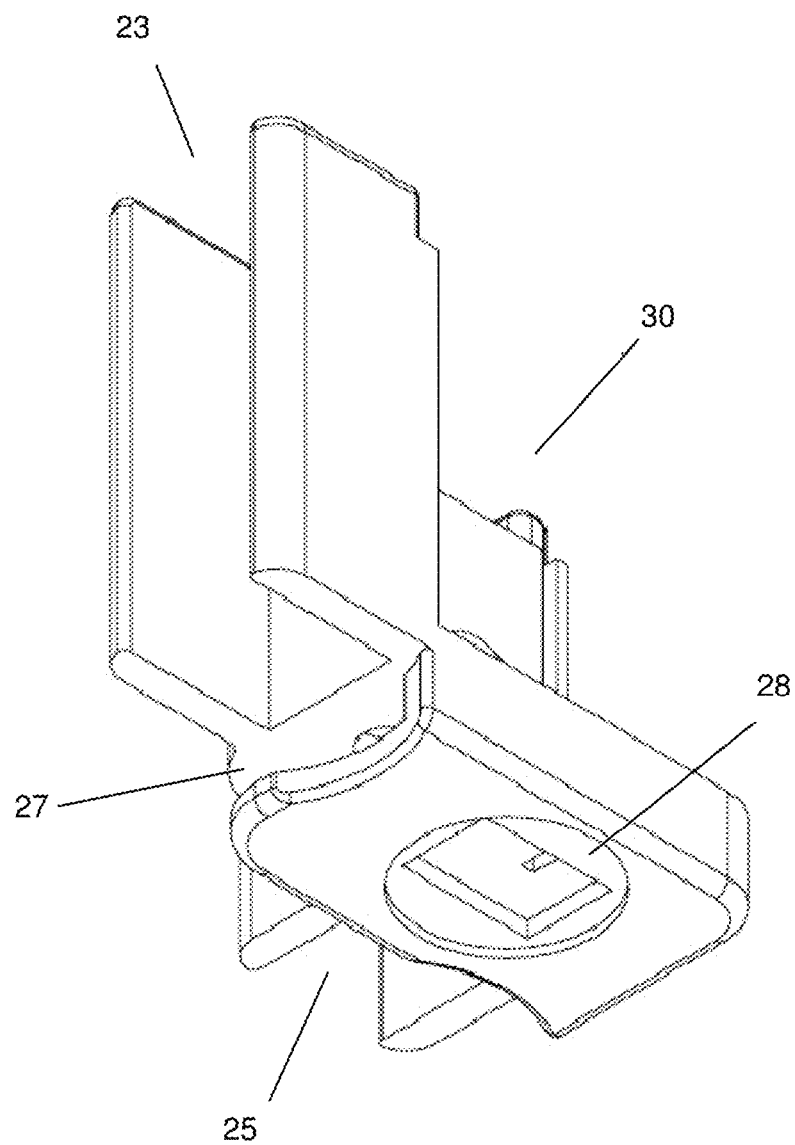
FIG. 5 illustrates a bottom perspective view of an inner portion of a corner connector in accordance with one embodiment of the invention

Turning to FIG. 5, inner portion 20 is shown from a bottom perspective view which clearly depicts bottom slot 27 adapted to receive a corner of the bottom member (not shown) and magnet recess 28, adapted to fit a magnet (not shown).

Figure 6:
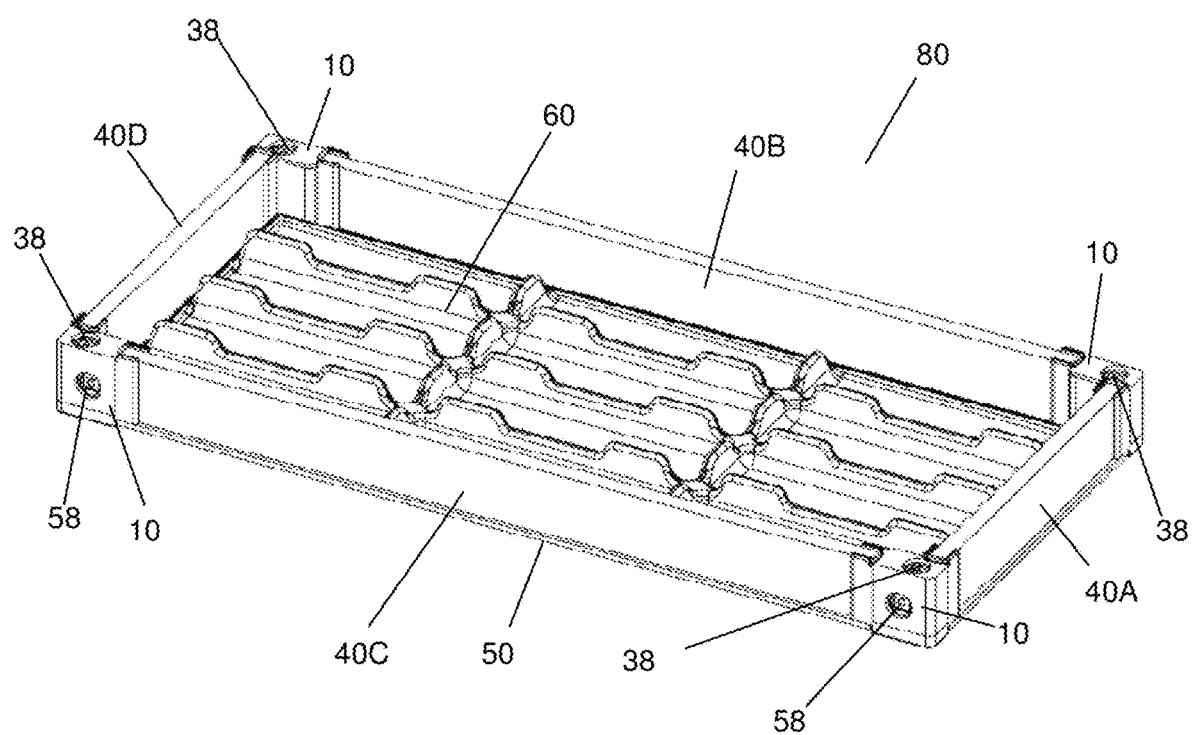
FIG. 6 illustrates a perspective view of a container made with corner connectors in accordance with one embodiment of the invention.
Figure 7A:
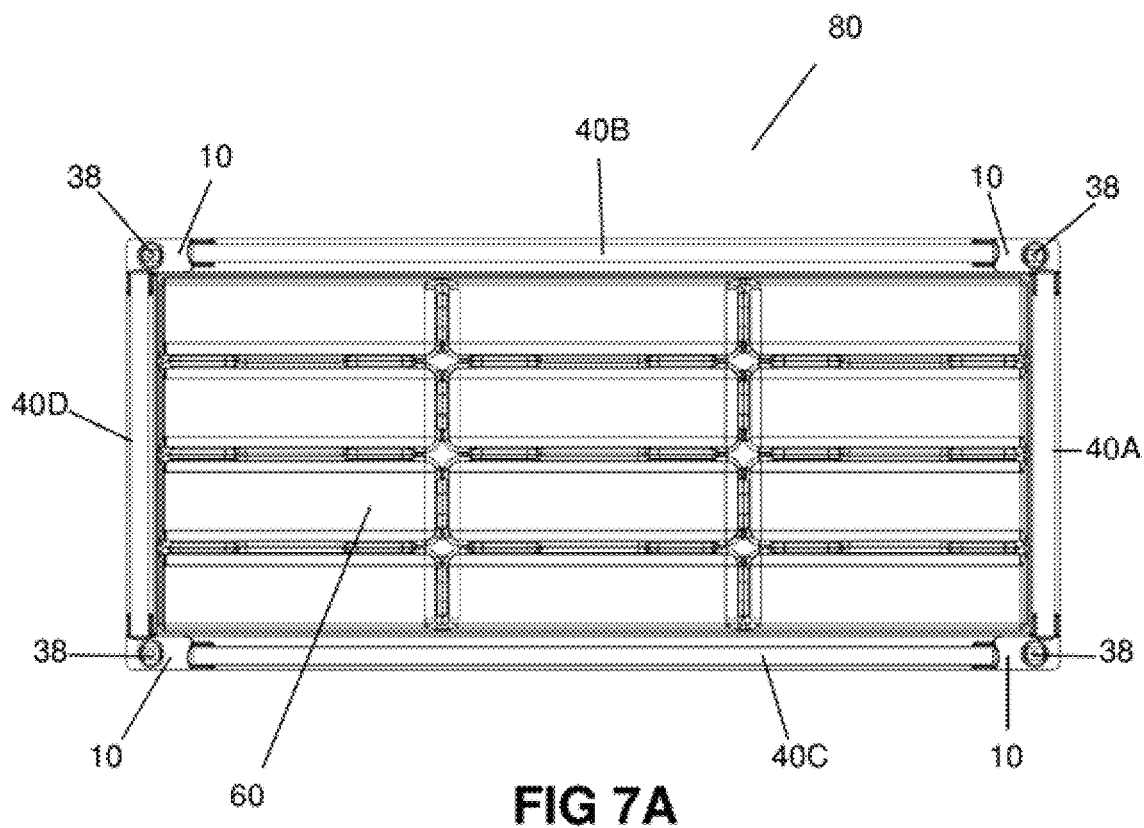
FIG. 7A illustrates a top view of a tray made with corner connectors in accordance with one embodiment of the invention.
Figure 7B:
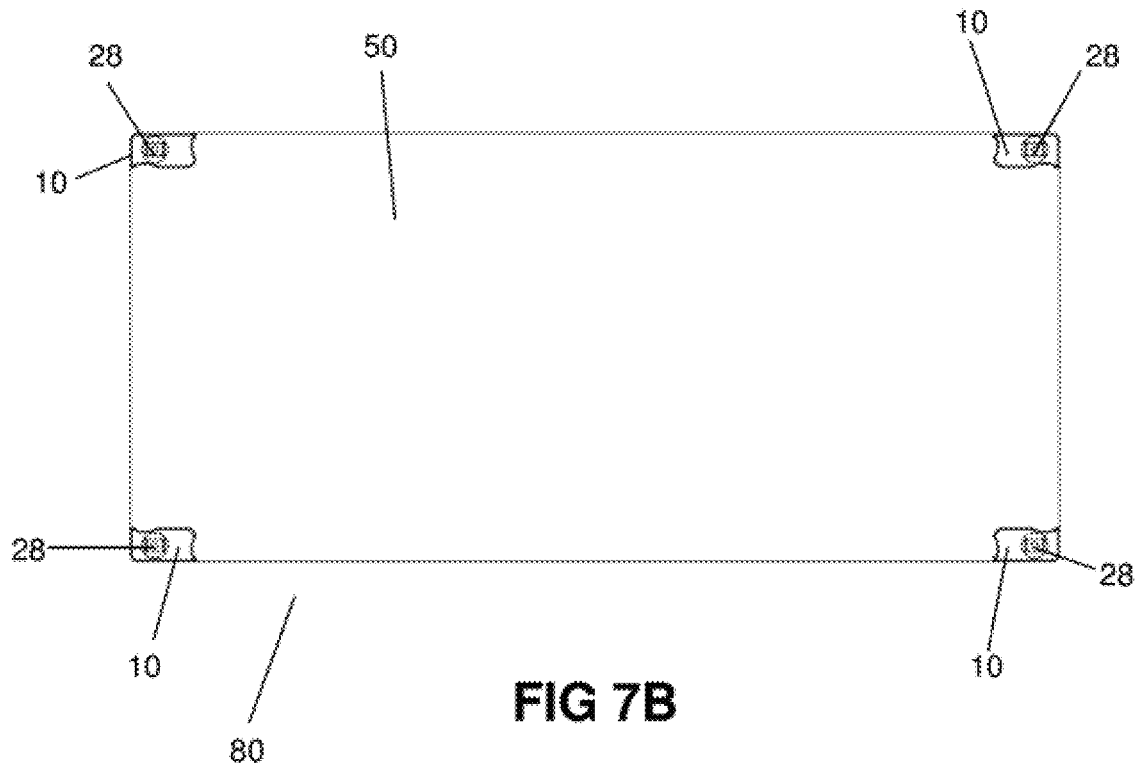
FIG. 7B illustrates a bottom view of a tray made with corner connectors in accordance with one embodiment of the invention.

FIG. 6 depicts one embodiment of an assembled container (in the form of a tray) 80 including sidewalls 40A, 40B, 40C and 40D, each connected by connectors 10. Also shown is molded insert 60 located within container 80. In this embodiment, container 80 further comprises recesses 58 on an outer surface of corner connector 10 adapted to fit a magnet (not shown). FIGS. 7A and 7B are a top view and bottom view, respectively, of the assembled tray of FIG. 6.

Figure 8:
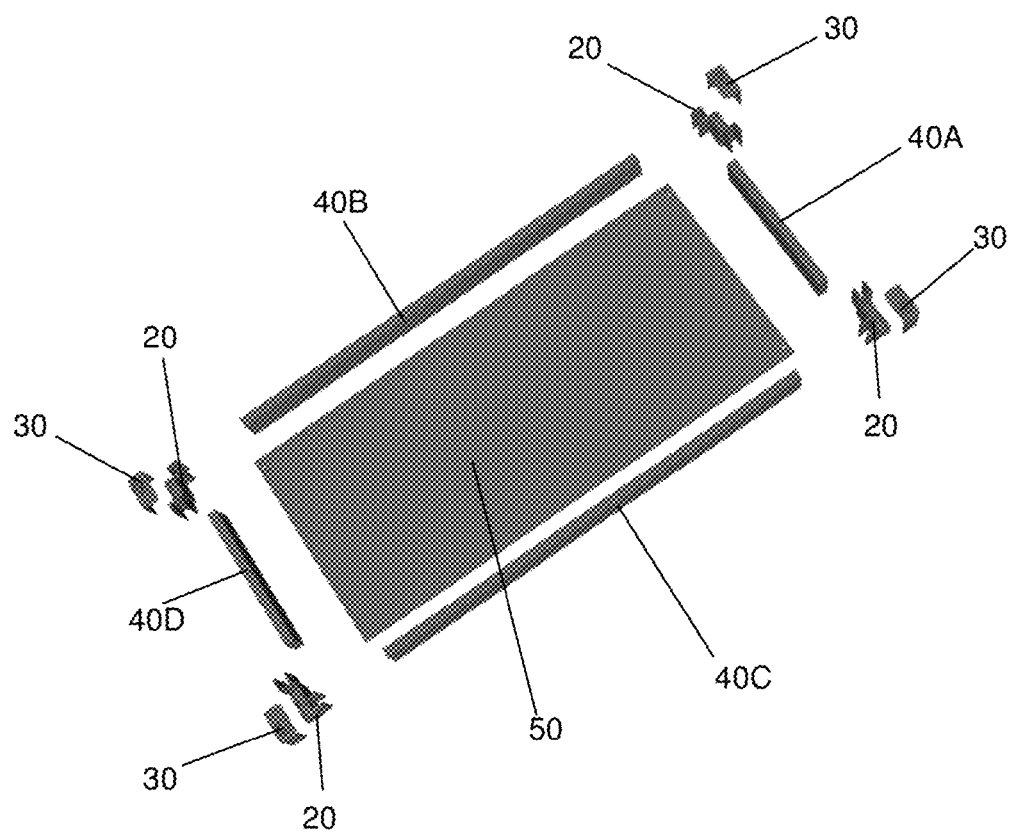
FIG. 8 illustrates an exploded view of a tray made with corner connectors in accordance with one embodiment of the invention.

Depicted in FIG. 8 is an exploded view of the components of a container in accordance with one embodiment of the present invention.

Figure 9:
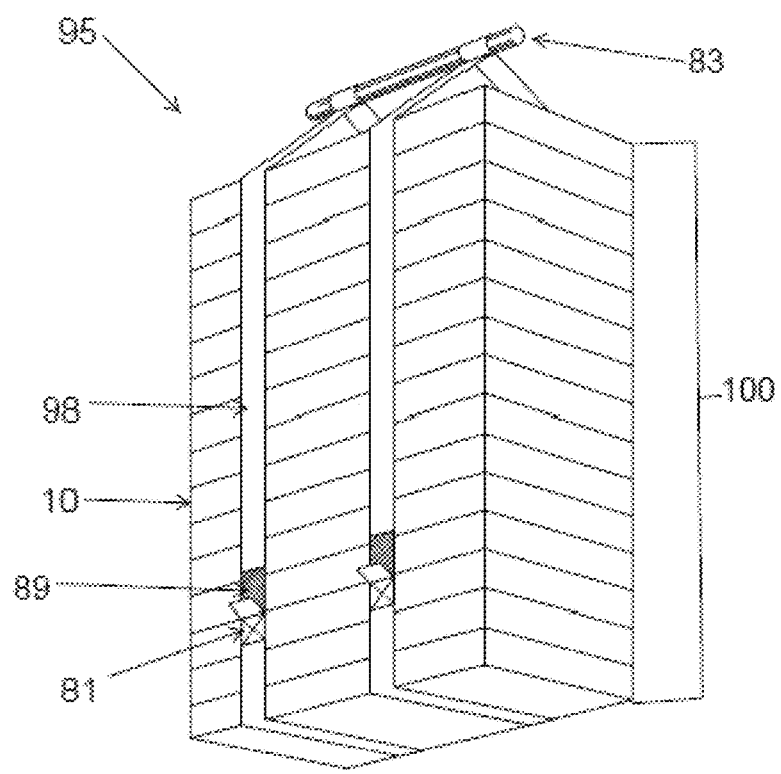
FIG. 9 illustrates a plurality of storage containers in a stacked transportation configuration with a carrying strap system, in accordance with one embodiment of the present invention.

Turning to FIG. 9, a plurality 100 of containers are shown in a stacked transport/storage configuration 95 with strapping system 90 installed. In this embodiment, strapping system 90 includes handle 83 and one or more straps 98 suitably sized to wrap around the plurality of containers 80 in the stacked transportation configuration 95 to facilitate transportation. Strap(s) 98 are provided with a plurality of magnets (not shown) located to correspond to, and interact with, magnets on the individual storage containers to provide additional security during transportation.

It will be readily understood that all components discussed herein can be constructed of any suitable materials including but not limited to polymeric materials, wood, cardboard. Further, all components discussed herein can be manufactured by any suitable process that will be readily appreciated by the skilled person.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

The scope of the claims should not be limited by the preferred embodiments set forth in the description, but should be given the broadest interpretation consistent with the description as a whole.

The invention claimed is:

1. A corner connector for connecting a first sidewall, a second sidewall and a bottom member to form a corner of a container, the connector comprising:
    an inner portion comprising a first inner wall, a second inner wall, and a bottom wall, the first inner wall comprising a first sidewall slot, the second inner wall comprising a second sidewall slot, and the bottom wall comprising a bottom slot, wherein the first sidewall slot, the second sidewall slot and the bottom slot are mutually orthogonal; and
    an outer portion comprising a first outer wall, a second outer wall and a top wall, the outer portion being adapted for secure attachment to the inner portion when the connector is assembled;
wherein the first sidewall slot is adapted to receive an end of the first sidewall, the second sidewall slot is adapted to receive an end of the second sidewall, and the bottom slot is adapted to receive a corner of the bottom member.

2. The corner connector according to claim 1, wherein the top wall of the outer portion further comprises a first recess adapted to fit a first magnet, and the bottom wall of the inner portion comprises a second recess adapted to fit a second magnet.

3. The corner connector according to claim 1, wherein the first inner wall further comprises a first opening adapted to receive a fastener for fastening an end of the first sidewall to the connector, and the second inner wall further comprises a second opening adapted to receive a fastener for fastening an end of the second sidewall to the connector.

4. The corner connector according to claim 1, wherein the bottom wall of the inner portion is further configured to fittingly engage the top wall of the outer portion when respective containers are in a stacked configuration.

5. A container comprising four sidewalls, a bottom member, and four corner connectors as defined in claim 1, wherein an end of each of said four sidewalls is inserted into a respective sidewall slot of one of said four corner connectors, and each corner of the bottom member is inserted into a respective bottom slot of one of said four corner connectors.

6. The container according to claim 5, wherein the first inner wall of each of said corner connectors and the second inner wall of each of said corner connectors each further comprises an opening adapted to receive a fastener for fastening the end of each of said four sidewalls to the respective corner connector.

7. The container according to claim 6, wherein the sidewalls are retained in the respective corner connector through the use of a fastener selected from screw fasteners, nails, press fittings, and expanding fittings.

8. The container according to claim 5, wherein the sidewalls are retained in the sidewall slot of the respective corner connector through the use of adhesive.

9. The container according to claim 5, wherein the sidewalls and the bottom member are formed of a material selected from high density foam, rubber, wood, plastics, laminated low density foam, or any combination thereof.

10. The container according to claim 5, wherein the top wall of the outer portion of the corner connector further comprises a first recess adapted to fit a first magnet, and the bottom wall of the inner portion of the corner connector comprises a second recess adapted to fit a second magnet.

11. The container according to claim 10, further comprising a magnet located in each of the first and second recesses.

12. A transport and storage system comprising:
    two or more containers as defined in claim 11; and
    optionally a molded insert sized to fit within each of the containers.

13. The system of claim 12, further comprising a strapping system comprising one or more straps suitably sized to wrap around the two or more containers in a stacked transport/storage configuration to facilitate transportation, and a handle attached to said one or more straps.

14. The system of claim 13, wherein the containers further comprise one or more magnets located on the first and/or second outer walls of the outer portion of the connector, and wherein the one or more straps further comprise a plurality of magnets located to interact with said one or more magnets located on the outer surface of the connectors when the two or more containers are in the stacked transport/storage configuration.

15. The system of claim 13, wherein the one or more straps further comprise a fastener system selected from hook and loop fasteners, snap fasteners, and buttons, wherein the fastener system is provided to secure the ends of the one or more straps together.

16. The system of claim 12, further comprising four wheels attached to a lower surface of a lowermost container.

* * * * *